United States Patent
Herring

(10) Patent No.: US 11,441,485 B2
(45) Date of Patent: Sep. 13, 2022

(54) ELECTRIC MOTOR CONTROL FOR DEMAND FUEL PUMPING SYSTEM

(71) Applicant: United Technologies Corporation, Farmington, CT (US)

(72) Inventor: Neal R. Herring, East Hampton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 148 days.

(21) Appl. No.: 16/815,802

(22) Filed: Mar. 11, 2020

(65) Prior Publication Data

US 2021/0180520 A1    Jun. 17, 2021

Related U.S. Application Data

(60) Provisional application No. 62/821,074, filed on Mar. 20, 2019.

(51) Int. Cl.

| | |
|---|---|
| *F02C 6/00* | (2006.01) |
| *F02C 7/236* | (2006.01) |
| *F02C 7/224* | (2006.01) |
| *F02C 9/26* | (2006.01) |

(52) U.S. Cl.
CPC ............. *F02C 7/236* (2013.01); *F02C 7/224* (2013.01); *F02C 9/26* (2013.01); *F05D 2260/213* (2013.01)

(58) Field of Classification Search
CPC ............. F02C 7/236; F02C 7/224; F02C 9/26
See application file for complete search history.

(56) References Cited

U.S. PATENT DOCUMENTS

| | | | | |
|---|---|---|---|---|
| 4,696,156 | A * | 9/1987 | Burr ...................... | F02C 7/14 60/39.08 |
| 8,166,765 | B2 | 5/2012 | Baker et al. | |
| 9,133,772 | B2 | 9/2015 | Heitz | |
| 9,140,191 | B2 | 9/2015 | Haugsjaahabink | |
| 9,657,643 | B2 | 5/2017 | Veilleux, Jr. | |
| 2009/0100823 | A1 * | 4/2009 | Jones ...................... | F02K 3/10 60/242 |
| 2015/0330444 | A1 * | 11/2015 | Wang ...................... | F04D 17/10 310/90.5 |
| 2017/0284351 | A1 * | 10/2017 | Incerpi ................... | F02C 9/26 |

FOREIGN PATENT DOCUMENTS

| | | |
|---|---|---|
| EP | 1897804 A1 | 3/2008 |
| EP | 3225793 A1 | 10/2017 |
| RU | 2507407 C1 | 2/2014 |

OTHER PUBLICATIONS

European Search Report for European Application No. 20163852.5 dated Aug. 11, 2020.

\* cited by examiner

*Primary Examiner* — Katheryn A Malatek
(74) *Attorney, Agent, or Firm* — Carlson, Gaskey & Olds, P.C.

(57) ABSTRACT

A fuel system for a gas turbine engine includes a first electric motor, a main fuel pump driven by the first electric motor to provide a fuel flow, and an actuator operable by a second electric motor. A first motor controller governs operation of the first electric motor. A second motor controller governs operation of the second electric motor. The second motor controller is operable to control operation of the first electric motor in response the first motor controller being incapable of governing operation of the first electric motor.

15 Claims, 2 Drawing Sheets

ELECTRIC MOTOR CONTROL FOR DEMAND FUEL PUMPING SYSTEM

CROSS-REFERENCE TO RELATED APPLICATIONS

This application claims priority to U.S. Provisional Application No. 62/821,074 which was filed on Mar. 20, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Fuel supplied to the combustor is provided by a mechanical pump driven by a rotating shaft of the engine. The mechanical pump is reliable and supplies fuel in proportion to engine speed. The minimum capacity of the mechanical pump is sized such that sufficient fuel is provided for high power conditions and/or engine starting. Excess fuel not needed is recirculated within the fuel system or back to the fuel tank. The fuel is further utilized as a coolant for other systems of the engine. Recirculation of fuel increases the temperature of the fuel and thereby reduces the available capacity to absorb heat from other systems. The capacity of the fuel to absorb heat from other systems is further limited by the characteristics of the fuel. At a certain temperature, the fuel begins to degrade and create deposits in the fuel system that can degrade engine performance. Reducing the amount of fuel that is recirculated during engine operation may improve the capacity of the fuel to absorb heat from other systems.

Turbine engine manufacturers continuously seek improvements to engine performance including improvements to thermal, transfer and propulsive efficiencies.

SUMMARY

A fuel system for a gas turbine engine according to an exemplary embodiment of this disclosure includes, among other possible things, a first electric motor, a main fuel pump driven by the first electric motor to provide a fuel flow, and an actuator operable by a second electric motor. A first motor controller governs operation of the first electric motor. A second motor controller governs operation of the second electric motor. The second motor controller is operable to control operation of the first electric motor in response the first motor controller being incapable of governing operation of the first electric motor.

In a further embodiment of the foregoing fuel system for a gas turbine engine, a control system controls operation of the first motor controller and the second motor controller and switching of the second motor controller to control operation of the first electric motor.

In another embodiment of any of the foregoing fuel systems for a gas turbine engine, the actuator comprises a control surface system for moving a control surface.

In another embodiment of any of the foregoing fuel systems for a gas turbine engine, the control surface system includes a default device for moving the control surface to a default position in response to the second motor controller being utilized to control the first electric motor.

In another embodiment of any of the foregoing fuel systems for a gas turbine engine, the control surface system includes a default motor control that is operable to control the second electric motor in response to the second motor controller being utilized for the first electric motor.

In another embodiment of any of the foregoing fuel systems for a gas turbine engine, the default motor control is positioned with the actuator.

In another embodiment of any of the foregoing fuel systems for a gas turbine engine, a heat exchanger receives a fuel flow from the main fuel pump for cooling flow from another system of the gas turbine engine.

In another embodiment of any of the foregoing fuel systems for a gas turbine engine, the first electric motor drives the main fuel pump at a speed that varies to tailor the fuel flow to an engine operating condition.

In another embodiment of any of the foregoing fuel systems for a gas turbine engine, the actuator comprises a component operable independent of the first electric motor.

A gas turbine engine according to an exemplary embodiment of this disclosure includes, among other possible things, a fan rotatable within a fan nacelle and a core engine including a compressor communicating compressed air to a combustor where compressed air is mixed with fuel and ignited to generate a high-energy gas flow expanded through a turbine. A fuel system includes a main fuel pump driven by a first electric motor to provide a fuel flow. The first electric motor drives the main fuel pump at a speed that varies to tailor the fuel flow to an engine operating condition. An actuator is operable by a second electric motor. A control system includes a first motor controller governing operation of the first electric motor and a second motor controller governing operation of the second electric motor. The second motor controller is operable to control operation of the first electric motor in response the first motor controller being incapable of governing operation of the first electric motor.

In a further embodiment of the foregoing gas turbine engine, the control system controls operation of the first motor controller and the second motor controller and switching of the second motor controller to control operation of the first electric motor.

In another embodiment of any of the foregoing gas turbine engines, the actuator is part of a control surface system that includes a default device for moving a control surface to a default position in response to the second motor controller being utilized to control the first electric motor.

In another embodiment of any of the foregoing gas turbine engines, the control surface system includes a default motor control that is operable to control the second electric motor in response to the second motor controller being utilized for the first electric motor.

In another embodiment of any of the foregoing gas turbine engines, a heat exchanger receives a fuel flow from the main fuel pump for cooling flow from another system of the gas turbine engine.

A method of controlling a fuel pump for a gas turbine engine according to an exemplary embodiment of this disclosure includes, among other possible things, generating a fuel flow with a main fuel pump driven by a first electric motor. Operation of the first electric motor is governed by a first motor controller. Control of the first electric motor is switched from the first motor controller to a second motor controller in response to the first motor controller being incapable of controlling the first electric motor. The second motor controller governs operation of a second electric motor that is part of an electromagnetic actuator prior to taking control of the first electric motor.

In a further embodiment of the foregoing method of controlling a fuel pump for a gas turbine engine, the main fuel pump is driven by the first electric motor to vary the fuel flow to minimize excess fuel flow.

In another embodiment of any of the foregoing methods of controlling a fuel pump for a gas turbine engine, a flow is cooled from another engine system with the fuel flow.

In another embodiment of any of the foregoing methods of controlling a fuel pump for a gas turbine engine, a default system of the electromagnetic actuator is engaged in response to the second motor controller being switched to control the first electric motor.

In another embodiment of any of the foregoing methods of controlling a fuel pump for a gas turbine engine, the default system is a mechanical device for moving a portion of the electromagnetic actuator to a default position.

In another embodiment of any of the foregoing methods of controlling a fuel pump for a gas turbine engine, the default system is a default motor control disposed at the second electric motor for moving the second electric motor in a predefined default manner.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
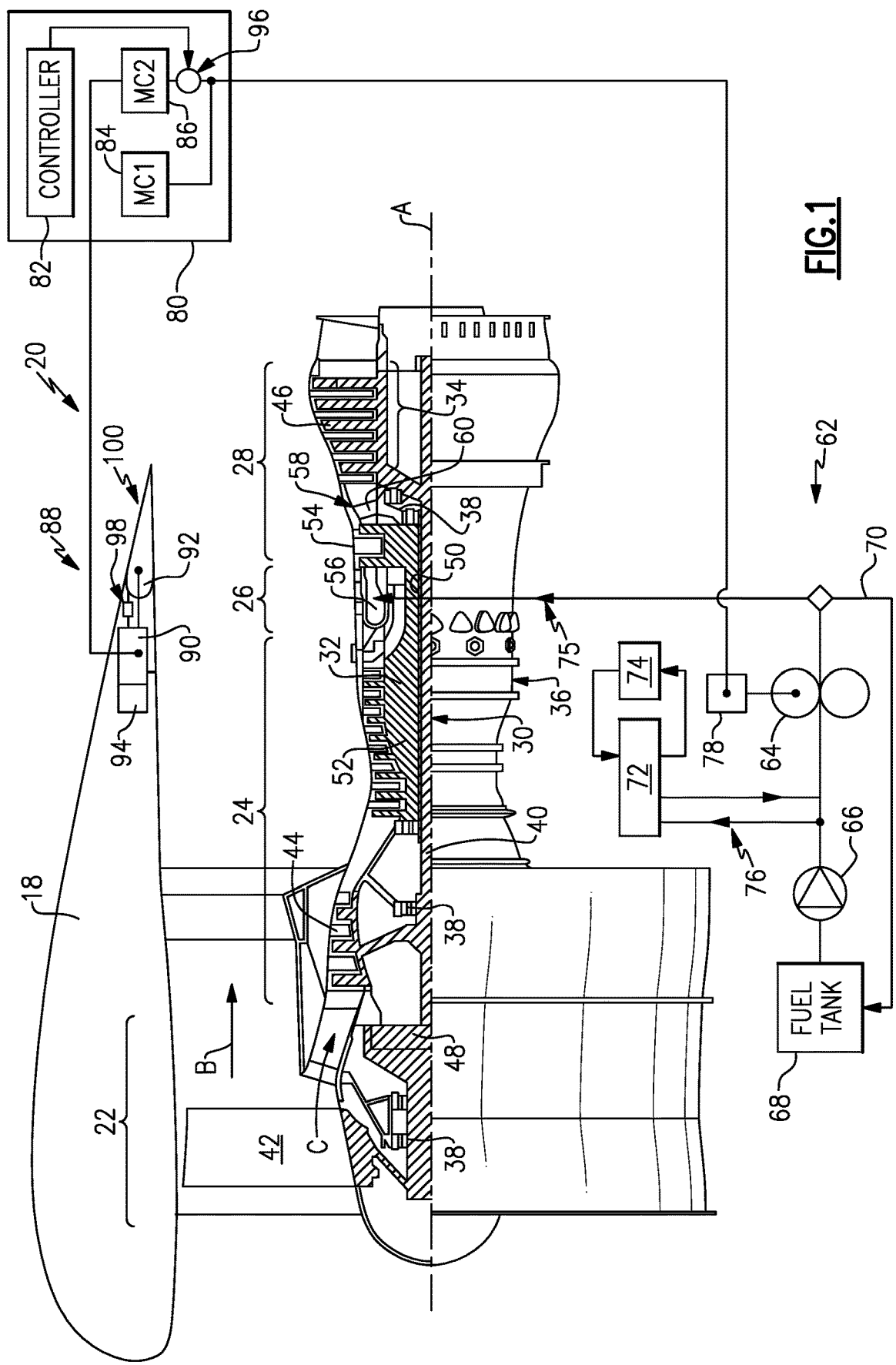
FIG. 1 is a schematic view of an example gas turbine engine including an example motor controller embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that the various bearing systems 38 may alternatively or additionally be provided at different locations, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Fuel is delivered to the combustor 56 by a fuel system 62. The example fuel system 62 includes a boost pump 66 that pumps fuel from a fuel tank 68 to a main fuel pump 64. The main fuel pump 64 generates a fuel flow 76 of a pressure and flow rate required for operation of the gas turbine engine 20 for a current operating condition. The main fuel pump 64 is driven by an electric motor 78 to enable a speed of the main fuel pump 64 to be varied to thereby tailor the fuel flow 75 to the combustor 56 based on engine operating conditions. Instead of simply providing a fuel flow that provides for extremes of operating demands, the disclosed fuel system 62 varies the fuel flow 75 according to a demand for fuel. By tailoring the flow of fuel to engine operating demand, fuel flow through a recirculation passage 70 can be reduced and/or eliminated.

Fuel is utilized as a heat sink to cool other flows within the engine such as lubricant and air flows. In this example, a heat fuel/oil heat exchanger 72 cools a flow of lubricant generated by a lubricant system 74. Recirculation of fuel results in an increased temperature of the fuel and thereby a reduced capability to accept heat from other engine systems, such as the example lubricant system 74. It should be appreciated that although a lubricant system 74 is disclosed by way of example, other heat generating systems of the engine and/or aircraft may also use the fuel as heat sink to cool a flow.

Control of the variable speed of the electric motor 78 is provided by a control system 80. The example control system 80 includes a first motor controller 84 that governs operation of the electric motor 78. The example control system 80 further includes a controller 82 that may be a dedicated controller or part of some other controller from another system that is part of the overall engine and/or aircraft controller. The controller 82 governs operation of the disclosed first motor controller 84. In this disclosure, the first motor controller 84 is a device that accepts input electric power in either DC or AC form and converts that power into a proper form for driving the electric motor 78.

As appreciated, the weight associated with a motor controller has an impact on overall engine efficiency. Moreover, in aircraft applications, back-up systems are needed to maintain operation of critical systems in the event of failure. Fuel delivery to the combustor 56 is such a system and thereby a back-up motor controller is desirable. However, the increased weight of an additional motor controller that would be seldom, if ever used, is not desirable.

An engine 20 and/or an aircraft powered by the engine will include other electric motors that also require motor controllers. In the disclosed example, an electromagnetic actuator system 88 is provided to move a control surface 100 within the nacelle 18. In the disclosed example, a motor 90 is provided to drive an actuator 92. The actuator 92 may be a drive that translates rotation of the electric motor 90 to linear movement to move an aircraft control surface 100. The actuator 92 may also be of a different configuration as required to perform a desired actuation. The electric motor 90 is controlled by a second motor controller 86.

The second motor controller 86 is part of the control system 80 and has the same or similar capabilities as the first motor controller 84 and is capable of controlling either of the electric motor 78 driving the main fuel pump 78 or the electric motor 90 of the actuator system 88. The example control system 80 is configured with a switch 96 to switch the second motor controller 86 to control operation of the electric motor 78 driving the main fuel pump 78 in the event that the first motor controller 84 is incapable of operating the electric motor 78. The switch 96 is shown schematically and may be any control device or circuit that is capable of switching control between the motor controllers 84, 86. By switching between the motor controllers 84, 86, an additional unused motor controller is not required to provide the desired redundancy. Instead, the second motor controller 86 is switched over to operate the electric motor 78 to maintain operation of the main fuel pump 64.

As appreciated, switching the second motor controller 86 over to operate the electric motor 78 leaves the electric motor 90 without a motor controller. In this disclosed example, the actuator system 88 includes a default mechanical device 98 for moving the control surface 100 to a default position. The default position is a position that provides limited function to enable operation until the flight or engine cycle is complete and repairs can be made. Accordingly, in this example default mechanical device 98 may be spring or other mechanical device that does not require external input for operation.

In another example, the electric motor 90 includes a default controller 94 that enables limited operation independent of the control system 80. The default controller 94 is of a simply design that is intended to provide limited operation as a limp home mode until complete repairs can be performed.

During routine engine operation, the first motor controller 84 governs operation of the electric motor 78 to drive the main fuel pump 64. The main fuel pump 64 generates the fuel flow 76 in a variable manner to match a demand by the engine 20 and to minimize excess fuel flow. Control of the electric motor 78 is switched from the first motor controller 84 to the second motor controller 86 in response to the first motor controller 84 being incapable of controlling the first electric motor 78. The second electric motor 90 is part of another system of the engine or aircraft that is less critical to engine operation than the fuel pump 64. In this disclosed example, the second electric motor 90 is part of the actuator assembly 88 however, the second electric motor may be part of another system of the engine, such as for example an electric motor driving a pump providing lubricant or hydraulic flow. Accordingly, any motor controller that controls a system determined to be of less importance to operation of the engine may be designated to provide the desired redundancy for operation of the electric motor 78.

The actuator assembly 88 is provided with default systems to enable limited operation in the absence of operation of the electric motor 90. The default systems can include a mechanical device 98 or a limited motor controller 94 that is a part of the actuator system 88. As appreciated, if another system is utilized, a suitable default device would be provided to maintain limited operation of that system until complete repairs are possible. However, regardless of which system or motor controller is utilized, operation of the fuel pump 64 continues and the actuator assembly 88, or other system, continues operation in a limited capacity until normal operation can be restored.

Figure 2:
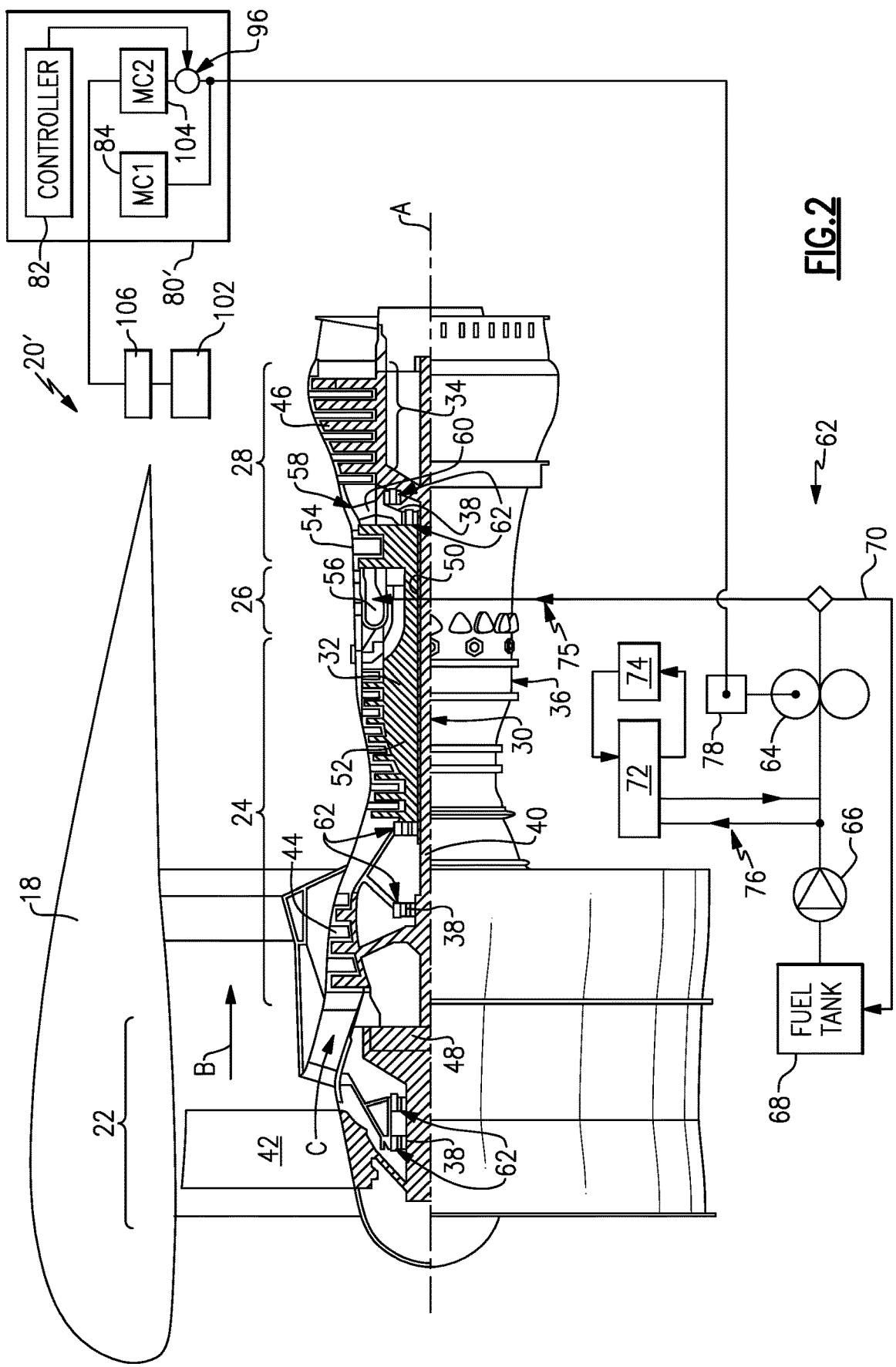
FIG. 2 is a schematic view of another example gas turbine engine including another example motor controller embodiment.

Referring to FIG. 2, another gas turbine engine embodiment 20' is schematically shown and includes the control system 80'. The above disclosed example utilized the motor controller 86 for an actuator 92 that moved the control surface 100. However, a motor controller utilized for any system of the engine 20' or aircraft could also be utilized to drive the electric motor 78 as needed.

Another disclosed example control system 80' includes the first motor controller 84 that governs operation of the electric motor 78 that drives the fuel pump 64. A second motor controller 104 governs operation of an electric motor 106 that drives an actuator 102. The actuator 102 and electric motor 106 are part of system that is separate and independent of the electric motor 78. The example actuator 102 can be any device or system operable as part of the gas turbine engine 20' or aircraft that utilizes an electric motor. The actuator 102 could be an actuator for a variable vane system, a bleed air control device, a thrust reverser or any other system that utilizes an electric motor. As appreciated, the motor 104 and actuator 102 are provided by way of example and any system that requires a motor controller for operation that is similar to the first motor controller 84 may be utilized and is within the contemplation and scope of this disclosure. The actuator 102 may have a default setting that is attained in the absence of the motor controller 104. As appreciated, the second motor controller 104 may be for any other system that can provide a suitable default operation to maintain limited operation of the actuator until complete repairs are possible.

Accordingly, the disclosed fuel systems provide a varied flow to match engine demand during operation that enables an increased heat acceptance capacity of the fuel while maintaining operational redundancy of the electric motor to assure uninterrupted fuel flow.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fuel system for a gas turbine engine comprising:
    a first electric motor;
    a main fuel pump driven by the first electric motor to provide a fuel flow;
    an actuator operable by a second electric motor wherein the actuator comprises a control surface system for moving a surface;
    a first motor controller governing operation of the first electric motor;
    a second motor controller governing operation of the second electric motor, wherein the second motor controller is operable to control operation of the first electric motor in response to the first motor controller being incapable of governing operation of the first electric motor; and
    a default mechanical device for moving the surface to a default position in response to the second motor controller being utilized to control the first electric motor.

2. The fuel system as recited in claim 1, including a control system controlling operation of the first motor controller and the second motor controller and switching of the second motor controller to control operation of the first electric motor.

3. The fuel system as recited in claim 1, wherein the control surface system includes a default motor control that is operable to control the second electric motor in response to the second motor controller being utilized for the first electric motor.

4. The fuel system as recited in claim 3, wherein the default motor control is positioned with the actuator.

5. The fuel system as recited in claim 1, including a heat exchanger receiving at least a portion of the fuel flow from the main fuel pump for cooling a flow from another system of the gas turbine engine.

6. The fuel system as recited in claim 1, wherein the first electric motor drives the main fuel pump at a speed that varies to tailor the fuel flow to an engine operating condition.

7. The fuel system as recited in claim 1, wherein the actuator comprises a component operable independent of the first electric motor.

8. A gas turbine engine comprising:
    a fan rotatable within a fan nacelle;
    a core engine including a compressor communicating compressed air to a combustor where the compressed air is mixed with fuel and ignited to generate a high-energy gas flow expanded through a turbine;
    a fuel system including a main fuel pump driven by a first electric motor to provide a fuel flow, wherein the first electric motor drives the main fuel pump at a speed that varies to tailor the fuel flow to an engine operating condition;
    an actuator operable by a second electric motor, wherein the actuator is part of a control surface system;
    a control system including a first motor controller governing operation of the first electric motor and a second motor controller governing operation of the second electric motor, wherein the second motor controller is operable to control operation of the first electric motor in response the first motor controller being incapable of governing operation of the first electric motor; and
    a default mechanical device for moving a surface of the control surface system to a default position in response to the second motor controller being utilized to control the first electric motor.

9. The gas turbine engine as recited in claim 8, wherein the control system controls operation of the first motor controller and the second motor controller and switching of the second motor controller to control operation of the first electric motor.

10. The gas turbine engine as recited in claim 8, wherein the control surface system includes a default motor control that is operable to control the second electric motor in response to the second motor controller being utilized for the first electric motor.

11. The gas turbine engine as recited in claim 8, including a heat exchanger receiving at least a portion of the fuel flow from the main fuel pump for cooling a flow from another system of the gas turbine engine.

12. A method of controlling a fuel pump for a gas turbine engine comprising:
- generating a fuel flow with the fuel pump driven by a first electric motor, wherein operation of the first electric motor is governed by a first motor controller; and
- switching control of the first electric motor from the first motor controller to a second motor controller in response to the first motor controller being incapable of controlling the first electric motor, wherein the second motor controller governs operation of a second electric motor that is part of an electromagnetic actuator prior to taking control of the first electric motor; and
- engaging a default system of the electromagnetic actuator in response to the second motor controller being switched to control the first electric motor, wherein the default system is a mechanical device for moving a portion of the electromagnetic actuator to a default position.

13. The method as recited in claim 12, wherein the fuel pump is driven by the first electric motor to vary the fuel flow to minimize excess fuel flow.

14. The method as recited in claim 12, including cooling a flow from another engine system with the fuel flow.

15. The method as recited in claim 12, wherein the default system is a default motor control disposed at the second electric motor for moving the second electric motor in a predefined default manner.

* * * * *